United States Patent [19]
Okabayashi

[11] Patent Number: 5,928,551
[45] Date of Patent: Jul. 27, 1999

[54] INDUCTION HEATING FIXING APPARATUS

[75] Inventor: Eiji Okabayashi, Toyokawa, Japan

[73] Assignee: Minolta Co., Ltd., Osaka, Japan

[21] Appl. No.: 08/783,179

[22] Filed: Jan. 15, 1997

[30] Foreign Application Priority Data

Jan. 16, 1996 [JP] Japan ................................. 8-004853

[51] Int. Cl.⁶ .............................................. H05B 6/06
[52] U.S. Cl. .......................................... 219/663; 219/627
[58] Field of Search .................................. 219/663, 627, 219/628, 632; 355/285; 363/98; 201/1

[56] References Cited

U.S. PATENT DOCUMENTS

| | | | |
|---|---|---|---|
| 3,742,174 | 6/1973 | Harnden, Jr. | 219/632 |
| 4,402,790 | 9/1983 | Lynn et al. | 201/1 |
| 4,532,396 | 7/1985 | Burack et al. | 219/632 |
| 4,617,441 | 10/1986 | Koide et al. | 219/627 |
| 4,866,592 | 9/1989 | Fujii et al. | 363/98 |
| 5,262,621 | 11/1993 | Hu et al. | 219/628 |
| 5,526,103 | 6/1996 | Kato et al. | 355/285 |

FOREIGN PATENT DOCUMENTS

| | | |
|---|---|---|
| 0 649 072 | 4/1995 | European Pat. Off. . |
| 59-033474 | 2/1984 | Japan . |
| 59-033475 | 2/1984 | Japan . |
| 59-033476 | 2/1984 | Japan . |
| 59-033477 | 2/1984 | Japan . |
| 7181821 | 7/1995 | Japan . |

*Primary Examiner*—Teresa Walberg
*Assistant Examiner*—Quang Van
*Attorney, Agent, or Firm*—McDermott, Will & Emery

[57] ABSTRACT

An induction heating fixing apparatus is disclosed which in characterized by comprising an object to be heated formed of an electroconductive material, a coil for effecting induction heating on the object to be heated, an inverter circuit for effecting the flow of a high frequency to the coil, a thermistor for detecting the temperature of the object to be heated, a control circuit electrically insulated from the inverter circuit and adapted to control the inverter circuit based on the temperature detected by the thermistor so as to keep the object to be heated at a temperature in a prescribed range, and an insulating switch for transmitting the control signal from the control circuit in an electrically insulated state to the inverter circuit.

47 Claims, 14 Drawing Sheets

INDUCTION HEATING FIXING APPARATUS

BACKGROUND OF THE INVENTION

1. Field of the Invention

This invention relates to a fixing apparatus to be used in electrophotographic copying device, printer, and facsimile. More particularly, the invention relates to an induction heating apparatus for fixing a toner image on a recording medium by means of induction heating.

2. Description of the Prior Art

The electrophotographic copying devices, printers, facsimiles, etc. are provided with a fixing apparatus for fixing a toner image on sheets such as recording paper and transfer material which are recording media. The fixing apparatus of this class, on receiving a sheet which has an unfixed toner image transferred in advance thereto, effects the fixation of the toner image on the sheet by causing the sheet to be nipped and conveyed between a fixing roller heated to a preset temperature and a pressing roller opposed to the fixing roller across a narrow gap thereby imparting the heat of the fixing roller to the toner and consequently melting the toner enough for the fixation.

This fixing apparatus uses, as the voltage to be supplied to a heat source for heating the fixing roller, the voltage of the commercial power supply (AC 100 V in the territory of Japan) in its unmodified form or as further elevated (above AC 100 V). It, therefore, requires to separate electrically a circuit for supplying electric power to the heat source and a control circuit system adapted to control the fixing apparatus as a whole and driven at a relatively low voltage. This measure is taken, in due respect of the fact that the control circuit system is connected to such parts as the connecting terminals and switches for various interfaces which are open for direct contact of the user's hands, to prevent the high voltage supplied to the heat source from flowing to the control circuit system by accident of some sort or other.

As respects the control of the temperature of this fixing apparatus, the conventional fixing apparatus which uses a halogen lamp as the heat source effects this control by monitoring the temperature of the fixing roller and turning off the halogen lamp whenever the detected temperature surpasses the prescribed level necessary for the fixation or turning on the halogen lamp after the detected temperature has fallen below this prescribed level thereby keeping the temperature of the fixing roller at the prescribed temperature range. This control is referred to as "ON/OFF" control.

In recent years, among other fixing apparatus, the fixing apparatus which utilizes induction heating has come to attract particular attention on account of the demand for quick start and economization of energy. The induction heating fixing apparatus is characterized by the quickness of temperature elevation because the fixing roller made of metal is caused to emit heat in itself by the magnetic flux generated by a high-frequency current flowing through a coil.

This induction heating fixing apparatus, however, incurs difficulty in keeping the temperature of the fixing roller at the prescribed level when it resorts to the ON/OFF control which is usually found in the conventional fixing apparatus using a halogen lamp.

The reason for this difficulty is as follows. In the fixing apparatus using a halogen lamp as the heat source, since the halogen lamp itself has a certain heat capacity besides the fixing roller inherently having a heat capacity and, therefore, is not immediately cooled after a power interruption and further since the fixing roller is indirectly heated by the thermal radiation from the halogen lamp and, therefore, the temperature of the fixing roller cannot be suddenly raised when the halogen lamp is turned on, the temperature can be kept at a relatively constant level even by the ON/OFF control. In contrast thereto, in the induction heating fixing apparatus, owing to the greatness of heating speed (temperature-increasing speed) which constitutes itself the salient characteristic of this apparatus, the fixing roller has the temperature thereof elevated in a very short time (several seconds) to the level necessary for the fixation (in the approximate range of 180 to 200° C.) after the coil has received a high-frequency current from an inverter circuit and it has the temperature abruptly lowered after the switch has been turned off. The ON/OFF control which is effected in this manner, therefore, has the problem of incurring difficulty in attaining a constant temperature. Particularly the induction heating fixing apparatus which uses a metal sleeve flexible because of such a small wall thickness as falls in the approximate range of several $\mu$m to some tens of $\mu$m is difficultly feasible as a fixing implement because the ON/OFF control, owing to the small thermal capacity of the metal sleeve, is suffered to give rise to a temperature ripple as much as 30 to 40° C., a level far exceeding the level of 4 to 5° C. which is accepted as proper for the temperature ripple of a fixing apparatus.

SUMMARY OF THE INVENTION

An object of this invention is to provide an inducting heating fixing apparatus which is provided with a control circuit adapted to insulate electrically a primary circuit side using high voltage and a secondary circuit side driven at low voltage and allowing connection thereto of switches and terminals to be manipulated by the user and enabled to repress to a great extent the temperature ripples of an object being heated and control the temperature at a substantially constant level.

This invention is directed to an induction heating fixing apparatus for enabling an object to be heated formed of an electroconductive material to emit heat by supplying a high-frequency current to a coil disposed in the proximity of the object to be heated thereby causing the object to be heated to generate an induced current, which apparatus comprises a high-frequency power source circuit for supplying the high-frequency current to the coil, a control circuit for issuing a control signal designating start or stop of the heating of the object to be heated, detecting means for detecting the temperature of the object to be heated, an adjusting circuit for adjusting the magnitude of electric power of the high-frequency current supplied by the high-frequency power source circuit to the coil based on the temperature detected by the detecting means when the control signal issued from the control circuit designates start of the heating, and a signal transmitting path for transmitting the control signal from the control circuit to the adjusting circuit, the signal transmitting path being so adapted as to effect the transmission of the control signal with the control circuit and the adjusting circuit kept in a mutually electrically insulated state.

As a result, the control signal is transmitted with the control circuit for designating start or stop of the heating of the object to be heated and the adjusting circuit for actually controlling the high-frequency power source circuit kept in a mutually electrically insulated state. The safety of the apparatus is high because the control circuit which has the possibility of being touched by the user for the sake of various operations is electrically separated from the high-frequency power source circuit. Further, the control of the temperature of the object to be heated can be infallibly carried out because the adjusting circuit controls the magnitude of electric power of the high-frequency current supplied from the high-frequency power source circuit to the coil based on the temperature detected by the detecting means.

This invention is also directed to an induction heating fixing apparatus for enabling an object to be heated formed of an electroconductive material to emit heat by supplying a high-frequency current to a coil disposed in the proximity of the object to be heated thereby causing the object to be heated to generate an induced current, which apparatus comprises a high-frequency power source circuit for supplying the high-frequency current to the coil, detecting means for detecting the temperature of the object to be heated, a control circuit for issuing a control signal for adjusting the magnitude of electric power of the high-frequency current supplied by the high-frequency power source circuit to the coil based on the temperature detected by the detecting means, and a signal transmitting path for transmitting the control signal from the control circuit to the high-frequency power source circuit, the signal transmitting path being so adapted as to effect the transmission of the control signal with the control circuit and the high-frequency power source circuit kept in a mutually electrically insulated state.

As a result, the control circuit for controlling the high-frequency power source circuit for the purpose of keeping the temperature of the object to be heated in a prescribed range and the high-frequency power source circuit for actually supplying a high-frequency current to the object to be heated are insulated electrically from each other. Further, since the temperature of the object to be heated which is elevated by induction heating is controlled based on the temperature detected by the detecting means serving to detect the magnitude of electric power of the high-frequency current supplied by the high-frequency circuit to the coil, it can be controlled infallibly. Since the control circuit for controlling the output of heat is electrically separated from the high-frequency power source circuit, the fixing apparatus of this invention, when used as in a copying device, a printer, or a facsimile, for example, allows a saving in the cost of equipment by permitting the control device for controlling the function itself of the copying device, printer, or facsimile to be used concurrently as a control circuit for controlling the temperature of the fixing apparatus.

This invention is directed to a method for controlling the temperature of an object to be heated in an induction heating fixing apparatus for enabling the object to be heated formed of an electroconductive material to emit heat by supplying a high-frequency current to a coil disposed in the proximity of the object to be heated thereby causing the object to be heated to generate an induced current, which method comprises a step of emitting a control signal designating start of supplying a high-frequency current to the coil by a control circuit, a step of transmitting the emitted control signal to an adjusting circuit through the medium of a signal transmitting path, a step of detecting the temperature of the object to be heated, a step of determining the magnitude of electric power of the high-frequency current supplied to the coil based on the detected temperature in response to the control signal transmitted thereto, and a step of supplying the high-frequency current of the determined magnitude of electric power to the coil, the signal transmitting path effecting the transmission of the control signal with the control circuit and the adjusting circuit in a mutually electrically insulated state.

Since the control signal, therefore, is transmitted with the control circuit for designating start or stop of the heating of the object to be heated and the adjusting circuit for actually controlling the high-frequency power source circuit kept in a mutually electrically insulated state, the safety of the apparatus is high as evinced by the fact the control circuit which has the possibility of being touched by the user for the sake of various operations is electrically separated from the high-frequency power source circuit. Further, the control of the temperature of the object to be heated can be infallibly carried out because the adjusting circuit controls the magnitude of electric power of the high-frequency current supplied to the coil based on the temperature detected by the detecting means.

This invention is also directed to a method for controlling the temperature of an object to be heated in an induction heating fixing apparatus for enabling the object to be heated formed of an electroconductive material to emit heat by supplying a high-frequency current to a coil disposed in the proximity of the object to be heated thereby causing the object to be heated to generate an induced current, which method comprises a step of detecting the temperature of the object to be heated, a step of determining the magnitude of electric power of the high-frequency current supplied to the coil based on the detected temperature, a step of issuing from a control circuit a control signal for the flow of the high-frequency current of the magnitude of electric power to the coil, a step of transmitting the issued control signal to a high-frequency power source circuit through the medium of a signal transmitting path, and a step of supplying a high-frequency current to the coil in accordance with the transmitted control signal, the signal transmitting path effecting the transmission of the control signal with the control circuit and the high-frequency power source circuit kept in a mutually electrically insulated state.

As a result, the control circuit for controlling the high-frequency power source circuit for keeping the temperature of an object to be heated in a prescribed range and the high-frequency power source circuit for supplying a high-frequency current to the object to be heated are electrically insulated from each other. The safety of the apparatus, therefore, is high because the control circuit having the possibility of being touched by the user for the sake of various operation is electrically separated from the high-frequency power source circuit. Then, the temperature of the object to be heated elevated by induction heating can be infallibly controlled because the control circuit adjusts the magnitude of electric power of the high-frequency current supplied to the coil based on the temperature detected by the detecting means. Further, since the control circuit for controlling the output of heat is electrically separated from the high-frequency power source circuit, the fixing apparatus of this invention, when used as in a copying device, a printer, or a facsimile, for example, allows a saving in the cost of equipment by permitting the control device for controlling the function itself of the copying device, printer, or facsimile to be used concurrently as a control circuit for controlling the temperature of the fixing apparatus.

DETAILED DESCRIPTION OF THE INVENTION

Now, working examples of this invention will be described below with reference to the drawings annexed hereto.

EXAMPLE 1

Figure 1:
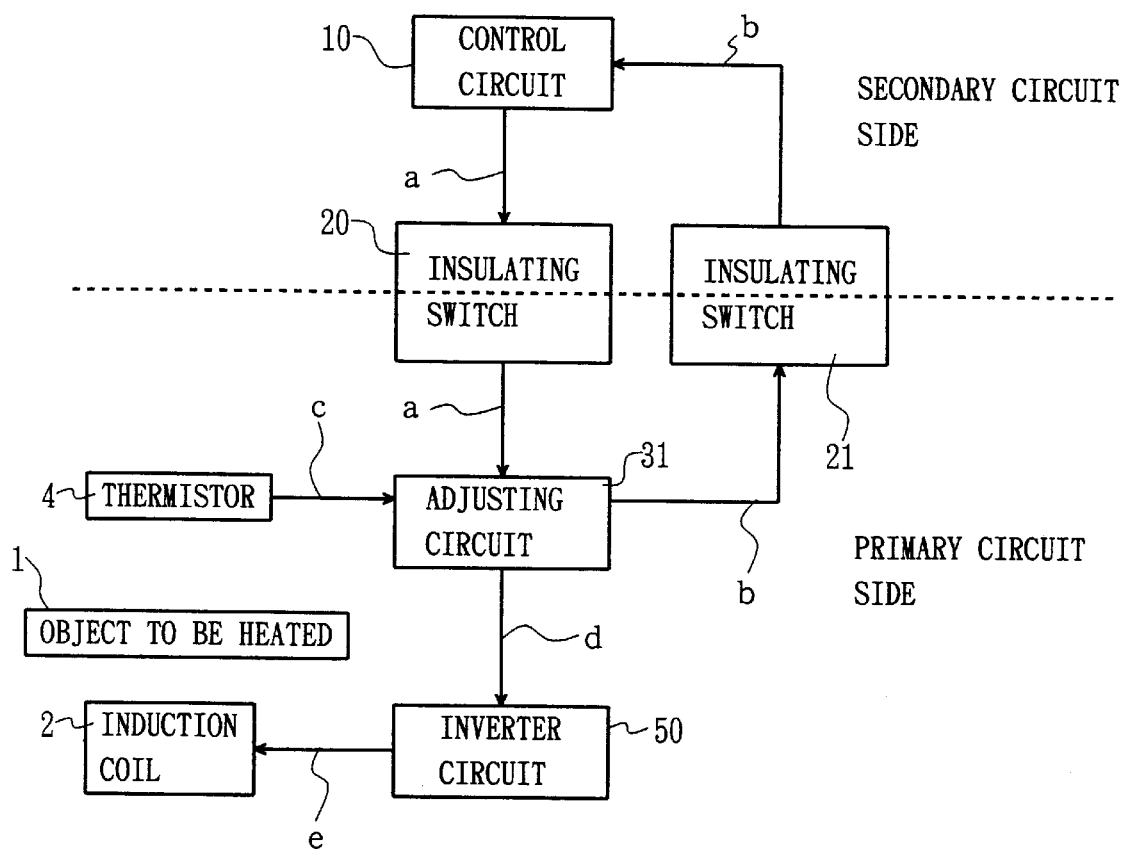
FIG. 1 is a block diagram as an aid in the description of the construction of a control system of Example 1 according to this invention.
Figure 2:
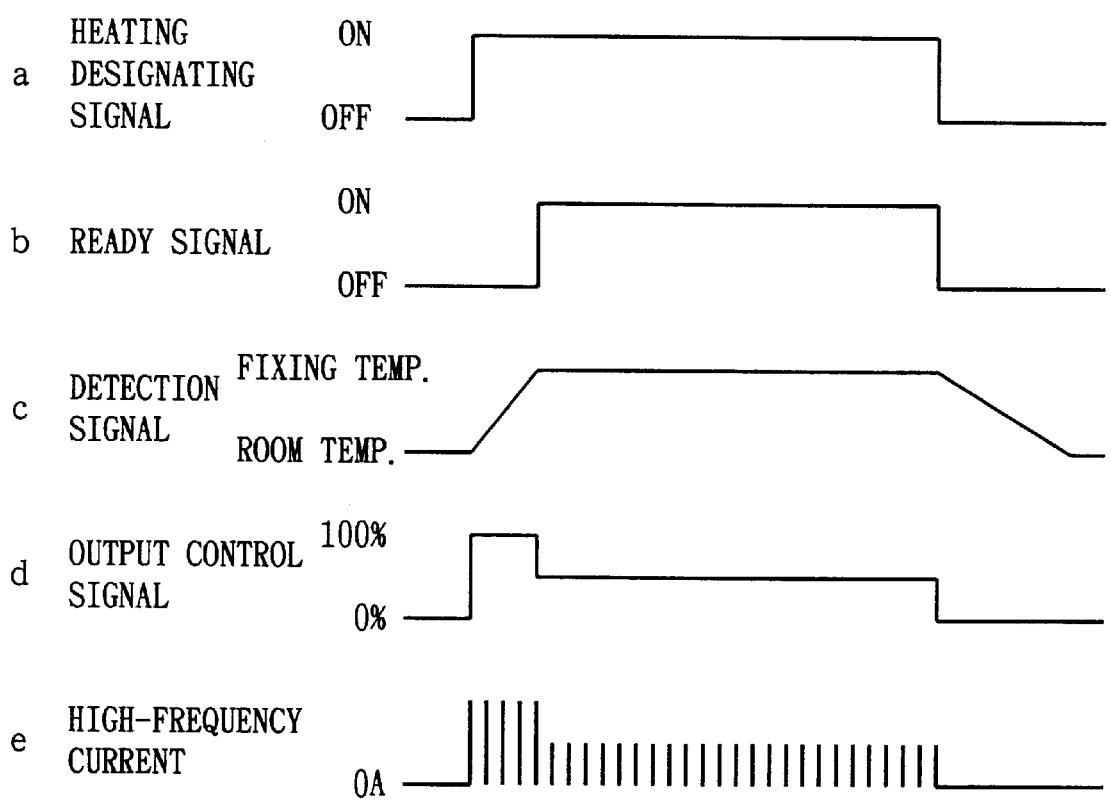
FIG. 2 is a timing chart as an aid in the description of the operation of the control system of Example 1 mentioned above.
Figure 3:
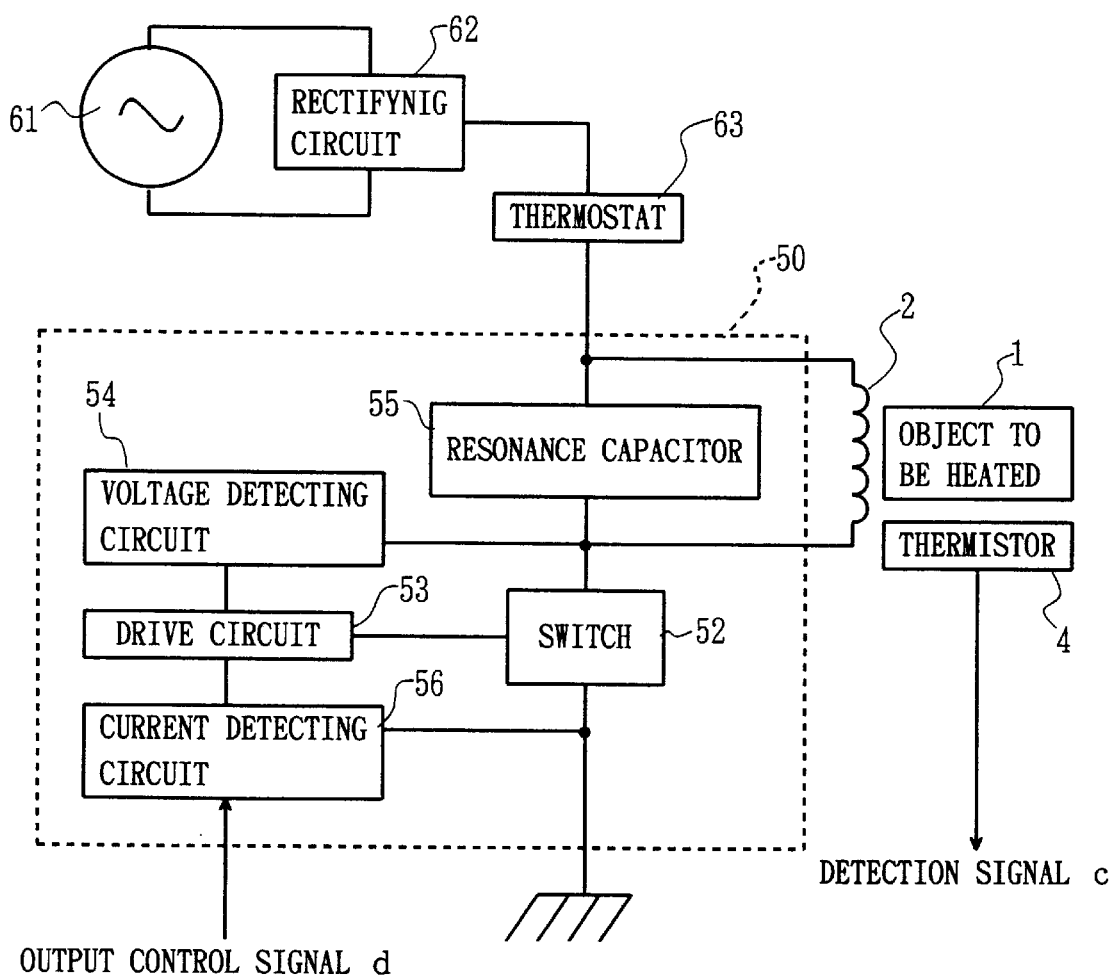
FIG. 3 is a block diagram as an aid in the description of one example of an inverter circuit shown in FIG. 2 above.
Figure 4:
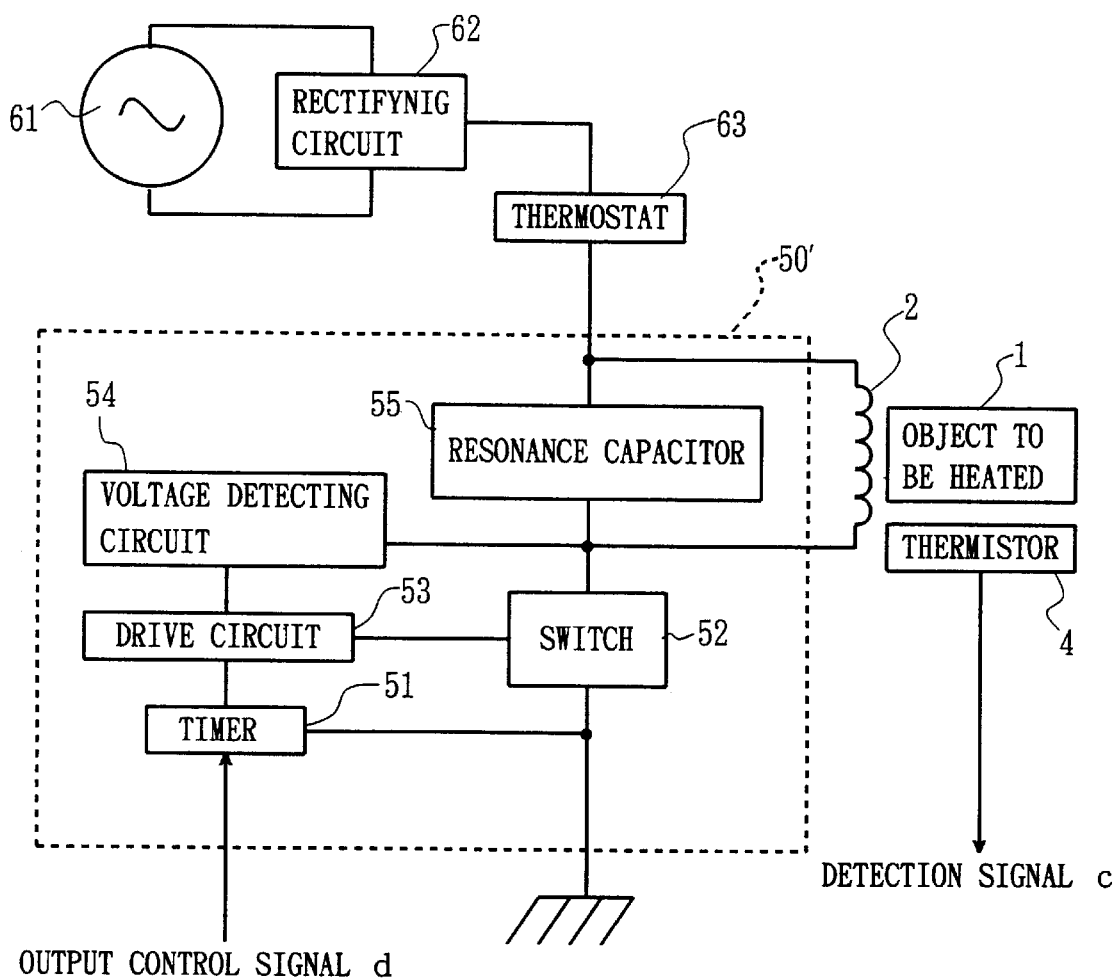
FIG. 4 is a block diagram as an aid in the description of another example of the inverter circuit shown in FIG. 2 above.
Figure 5:
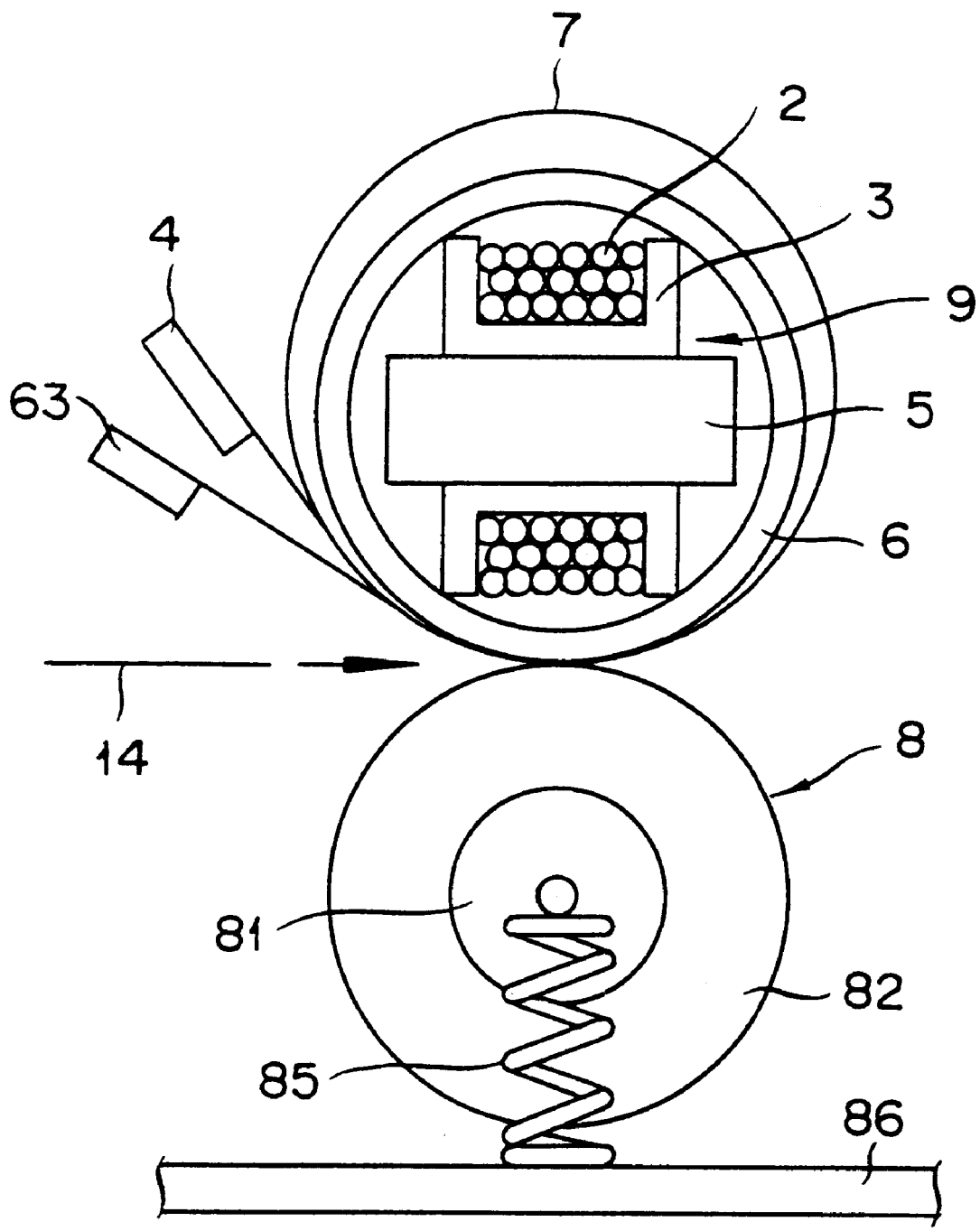
FIG. 5 is a cross section as an aid in the description of the construction of a mechanical system of Example 1 described above.

FIG. 1 is a block diagram as an aid in the description of the construction of a control system in an induction heating fixing apparatus embodying this invention, FIG. 2 a timing chart as an aid in the description of the operation of the induction heating fixing apparatus, FIG. 3 and FIG. 4 each a block diagram as an aid in the description of an inverter circuit to be used in the induction heating fixing apparatus, and FIG. 5 is a schematic cross section as an aid in the description of the construction of a mechanical system of the induction heating fixing apparatus.

First the construction and operation of the control system and then the construction of the mechanical system will be described with reference to the diagrams.

The control system of the induction heating fixing apparatus, as illustrated in FIG. 1, is provided on the secondary circuit side thereof with a control circuit 10 for issuing a control signal designating start or stop of the heating of an object to be heated 1 and controlling the operation of a pressing roller which will be specifically described herein below and the conveyance of a sheet. This control circuit 10 is driven with a voltage in the neighborhood of several volts. On the primary circuit side, the control system is provided with an inverter circuit 50 for supplying a high-frequency current to an induction coil 2 serving to effect induction heating on the object to be heated 1 and an adjusting circuit 31 for controlling the inverter circuit 50 by determining the heating output based on the signal from a thermistor 4 disposed in the proximity of (or in contact with) the object to be heated 1 made of metal.

The control system is provided between the primary circuit side and the secondary circuit side thereof with an insulating switch 20 for transmitting the control signal from the control circuit 10 in an electrically insulated state to the adjusting circuit 31 and an insulating switch 21 for transmitting a ready signal informing that the object to be heated 1 has reached a temperature fit for the fixation from the adjusting circuit 31 to the control circuit 10. The insulating switches 20 and 21 are only required to be capable of transmitting the status of ON or OFF in an electrically insulated state. A photocoupler, for example, is usable therefor.

Incidentally, as the object to be heated 1, a fixing roller (hard roller) or a flexible metal sleeve may be used, for example.

The control system constructed as described above operates as shown in the timing chart of FIG. 2. First, the control circuit 10 emits a heating designating signal a as the control signal designating start or stop of the heating of the object to be heated 1. This heating designating signal a is transmitted by the insulating switch 20 to the adjusting circuit 31. The adjusting circuit 31 emits an output control signal d to set the inverter 50 driving while monitoring the voltage emanating from the thermistor 4. At first, since the object to be heated 1 is in an unheated state, a detection signal c emitted from the thermistor 4 has a voltage which represents room temperature. From the adjusting circuit 31, an output control signal d which causes 100% output is transmitted to the inverter circuit 50. As a result, the object to be heated 1 is caused by a magnetic field generated by the induction coil 2 to emit heat and rise quickly to a temperature fit for the fixation (fixing temperature in the approximate range of 180 to 200° C.).

When the object to be heated 1 is heated to the fixing temperature, the detection signal c of the thermistor 4 is raised to a voltage which conforms to the fixing temperature. The adjusting circuit 31 which is monitoring the signal from the thermistor 4 adjusts the output control signal d to an output in the approximate range of 40 to 50% so as to prevent the temperature of the object to be heated 1 from rising any further and keep it at a level fit for the fixation. As a result, a high-frequency current e emitted from the inverter circuit 50 represents an output in the approximate range of 40 to 50% and the temperature of the object to be heated 1 can be kept at a substantially constant level.

Generally, the temperature of the object to be heated 1 in the present fixing apparatus, unless a special cooling device is used, falls at a lower speed than when it rises, though not so distinctly as in the conventional fixing apparatus using a halogen lamp. The reason for the slow cooling of the object is that the object to be heated 1 itself is stowed inside the fixing apparatus and consequently is not readily cooled and that the object to be heated 1 has the induction coil 2 stowed therein as will be described specifically afterward. In contrast thereto, the temperature rises very quickly because the object to be heated 1 itself is caused to emit heat by induction heating as already described. In the conventional fixing apparatus resorting to the ON/OFF control, the temperature abruptly rises and elicits a temperature ripple of 30 to 40° C. when the heating output is turned off completely provisionally after a rise of temperature and then the high-frequency current to the induction coil is turned on (heating output 100%). When the heating output is not completely turned off but continued at a level of about 40 to 50% after the temperature has reached the level for the fixation as described above, the rise of the temperature of the object to be heated 1 is repressed and, at the same time, the temperature (for the fixation) is kept intact.

When the adjusting circuit 31 for controlling the heating output of the object to be heated 1 is disposed on the primary circuit side as in the present example, the thermistor 4 can be also disposed on the primary circuit side and no insulation is needed between the object to be heated 1 and the thermistor 4. As a result, the restriction imposed on the configuration of apparatus is decreased and the freedom of apparatus design is increased.

In the adjusting circuit 31, when the temperature of the object to be heated 1 reaches the level for the fixation, a ready signal b serving to inform the control circuit 10 of this fact is turned on at the same time. The control circuit 10, on detecting the ready signal b, issues a command to rotate the pressing roller and convey the sheet.

Now, one example of the inverter 50 to be used herein will be described.

FIG. 3 is a block diagram as an aid in the description of this example of the inverter circuit. When the alternating current of a commercial power source (AC 100 V) 61 is rectified by a rectifying circuit 62 into a direct current (DC), this inverter circuit 50 serves the purpose of converting the DC into a high-frequency current and applying the high-frequency current to the induction coil 2.

The supply of the high-frequency current (AC current) to the induction coil 2, therefore, is accomplished by the fact that the rectifying circuit 62 rectifies the AC 100 V into the DC and applies the DC to the induction coil 2 and a resonant capacitor 55 which jointly constitute an LC resonant circuit and a switch 52 formed of a transistor, an FET, or an IGBT, for example, and serially connected to the rectifying circuit 62 and the LC resonant circuit is switched by a drive circuit 53.

The timing for turning off the switch 52 is determined by a current detecting circuit 56 and the timing for turning on the switch 52 is determined by a voltage detecting circuit 54.

The timing for turning off the switch 52 relies on the mechanism that the flow of electric current to the induction coil 2 is started when the switch 52 is turned on, the voltage generated consequently is detected by a current detecting resistance which a current detecting circuit 56 incorporates therein, and a signal to turn off the switch 52 is issued to the drive circuit 53 when the detected voltage surpasses the magnitude of voltage determined by the output control signal d from the adjusting circuit 31 mentioned above. The signal emanating from the drive circuit 53 turns off the switch 52. In contrast thereto, the timing for turning on the switch 52 relies on the mechanism that a signal to turn on the switch 52 is sent to the drive circuit 53 when the voltage detecting circuit 54 detects the fact that the induction coil voltage of the induction coil 2 falls to the neighborhood of 0 V.

As a result, the high-frequency current (alternating current) is applied to the induction coil 2 and the object to be heated 1 is caused to elicit induction heating and consequently emit heat.

When the inverter circuit constructed as described above is used, the output control signal d is supplied to the current detecting circuit 56 and eventually converted into a voltage for determining the OFF timing. By varying analogously the voltage of the output control signal d, therefore, the heating output can be arbitrarily controlled. When the voltage of the output control signal d is heightened, the duration of the OFF timing emitted by the current detecting circuit 56 is elongated, the magnitude of electric power accumulated in the induction coil 2 is enlarged, and the heating output is augmented. In contrast, when the voltage of the output control signal d is lowered, the duration of the OFF timing is shortened and the heating output is lowered.

The inverter circuit 50 is provided between itself and a power source 61 with a thermostat 63 for detecting any abnormal temperature of the object to be heated 1 and interrupting the supply of electric power from the power source 61 besides the thermistor 4 for the purpose of preventing the object to be heated 1 from being heated to an abnormally elevated temperature by some trouble or other in the circuit.

Next, another example of the inverter circuit will be explained below.

FIG. 4 is a block diagram as an aid in the description of this example of the inverter circuit. This inverter circuit 50' is similar to the inverter circuit illustrated in FIG. 3 above in respect that the alternating current of the commercial power source (AC 100 V) is rectified by the rectifying circuit 62 into a direct current (DC), the DC is converted by the inverter circuit 50' into a high-frequency current, and the high-frequency current is applied to an LC resonant circuit formed of an induction coil 2 and a resonant capacitor 55. The inverter circuit 50', however, differs from the inverter circuit 50 in terms of the method for output control.

In this inverter circuit 50', the high-frequency current (alternating current) to the induction coil 2 is attained as follows. AC 100 V is rectified by the rectifying circuit 62 into a DC and this DC is applied to the induction coil 2 and the resonant capacitor 55 which jointly constitute the LC resonant circuit. The supply of the high-frequency current is attained by the fact that the switch 52 formed of a transistor, an FET, or an IGBT, for example, and serially connected to the rectifying circuit 62 and the LC resonant circuit is switched by the drive circuit 53. Though the ON timing of the switch 52 is determined by the voltage detecting circuit 54, the OFF timing of the switch 52 is determined by the timer circuit 51 unlike that which occurs in the inverter circuit 50 mentioned above.

The ON timing of the switch 52 similarly relies on the mechanism that the voltage detecting circuit 54, on detecting the fact that the voltage generated by the resonance of the induction coil 2 and the resonant capacitor 55 has fallen below a prescribed magnitude of voltage, 0 V in the present case, issues a signal to the drive circuit 53 and the drive circuit 53 turns on the switch 52 in response to the signal. In contrast, the OFF timing of the switch 52 relies on the mechanism that the timer circuit 51 issues a signal of a prescribed duration to the drive circuit 53 and the drive circuit 53 turns off the switch 52 in response to the signal.

The timer 51 has a simple configuration using a resistor and a capacitor and plays the role of issuing an OFF timing signal to the drive circuit 53 after the elapse of a prescribed duration to be determined by the CR recharging-discharging property which depends on the duration of an ON signal of a fixed voltage from the output control signal d. When this inverter circuit is used, therefore, an ON/OFF signal of a prescribed voltage is issued to the timer circuit 51 as the output control signal d for the control of the heating output.

This inverter circuit 50', similarly to the inverter circuit 50 mentioned above, is provided between itself and the power source 61 with the thermostat 63 adapted to prevent the object to be heated 1 from being heated to an abnormally high temperature.

Now, the construction and the operation of the mechanical system of the induction heating fixing apparatus will be described below with reference to one example of the fixing apparatus.

FIG. 5 is a side view illustrating the induction heating fixing apparatus.

In this induction heating fixing apparatus, a coil assembly 9 composed of a core 5 and the induction coil 2 wound round the core 5 is accommodated in a holder unit 6. This holder unit 6 is surrounded by the object to be heated which is caused to emit heat by the induced current of the induction coil 2. The object to be heated in this case is a flexible fixing sleeve 7 made of metal. A pressing roller 8 moves a sheet 14 such as the recording paper or the transfer material to and past the nip part while pressing the holder unit 6 and the fixing sleeve 7 follows the sheet 14 and melts the toner on the sheet 14 and fixes the molten toner to the sheet 14.

The fixing sleeve 7 is appropriately made of such a ferromagnetic material as, for example, iron and nickel. The fixing sleeve 7, when made of a ferromagnetic material, passes many magnetic fluxes therethrough and emits heat with improved efficiency. The fixing sleeve 7 aptly has a thickness in the approximate range of 20 to 60 $\mu$m. The thermal capacity of the fixing sleeve 7 decreases and consequently the power consumption for generation of heat decreases in proportion as the thickness of the fixing sleeve 7 decreases. If the fixing sleeve 7 has an unduly small thickness, however, it will lose strength and tend to break and, during the course of manufacture, will incur difficulty in acquiring a uniform thickness. If the fixing sleeve 7 has an unduly large thickness, it will offer poor resistance to bending and exhibit an inferior ability to endure a partial bend in the nip part. This fixing sleeve 7 is not fixed to any part of the interior of the apparatus but is allowed to rotate freely round the holder unit 6.

The holder unit 6 is fixed to the main body of the fixing apparatus. The surface of the holder unit 6, or at least the part thereof which contacts the fixing sleeve 7, is formed of a smooth heat-resistant resinous material. Thus, the friction resistance between the holder unit 6 and the fixing sleeve 7 is smaller than the friction resistance between the sheet 14 and the fixing sleeve 7. By the rotation of the pressing roller 8, therefore, the fixing sleeve 7 is caused to follow the motion of the sheet 14. The holder unit 6 is provided at the opposite terminals thereof with flanges (not shown) which prevent the fixing sleeve 7 to deviate in the direction of length of the holder unit 6.

Figure 6:
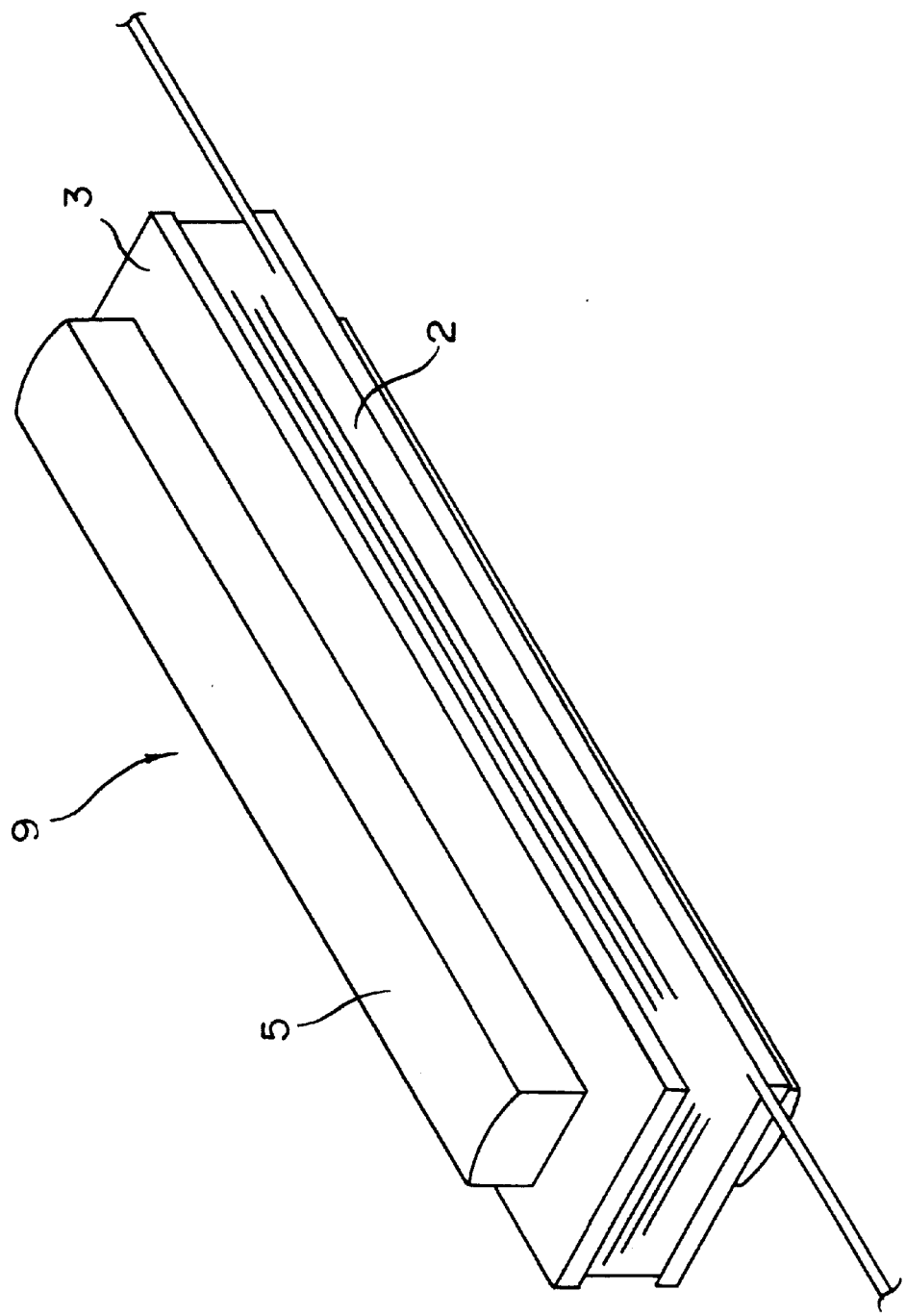
FIG. 6 is a perspective view illustrating a coil assembly shown in FIG. 5 above.

The coil assembly 9 is provided, as shown in FIG. 6, with a bobbin 3 having a cross section of the shape of three sides of a square and consequently forming a through hole in the central part thereof. The induction coil 2 is formed round this bobbin 3 by continuously winding a copper wire in a plurality of plies arranged substantially neatly (so that the work of trimming or tying wire terminals may be omitted). In the through hole of the bobbin 3, the core 5 is inserted perpendicularly to the copper wires of the induction coil 2. The bobbin 3 is aptly formed of a ceramic material or a heat-resistant insulating engineering plastic material.

Appropriately, the induction coil 2 is formed of a single or litz copper wire which is provided on the surface thereof with a fused layer and an insulating layer.

The core 5 is formed of a ferrite core or a laminated core, for example.

Then, the coil assembly 9 is accommodated in the holder unit 6 which is formed of a heat-resistant insulating engineering plastic material. The induction coil 2 is provided at the terminal thereof with a connector terminal. The high-frequency current is supplied to the induction coil 2 through the medium of the connector terminal.

The pressing roller 8 comprises a shaft core 81 and a silicone rubber layer 82, a surface release type heat-resistant rubber layer, wrapped round the shaft core 81. Bearing parts (not shown) are formed one each at the opposite ends of the pressing roller 8. This pressing roller 8 is pressed through the medium of the fixing sleeve 7 against a fixing unit frame 86 with a spring member 85 in the direction of the holder unit 6 and is set in place rotatably. A drive gear (not shown) is fixed to one end of the pressing roller 8. The pressing roller 8, therefore, is rotated by a drive source (not shown) such as, for example, a motor connected to the drive gear.

The fixing sleeve 7 is provided, as approximated very closely to the fixing sleeve 7 or as held in contact with the fixing sleeve 7, a thermistor 4 which is adapted to detect the temperature of the fixing sleeve 7.

Further, the fixing sleeve 7 is provided, as approximated very closely to or held in contact with the fixing sleeve 7, with a thermostat 63 which is adapted to interrupt the supply of electric power when it detects an abnormally high temperature of the fixing sleeve 7.

The induction heating fixing apparatus which is constructed as described above operates as follows.

The sheet 14 to which an unfixed toner image has been transferred is conveyed from the direction of left in the bearings of FIG. 5 and is forwarded in the direction of the nip part between the fixing sleeve 7 and the pressing roller 8. The sheet 14, now held down by the pressure exerted by the holder unit 6 and the pressing roller 8, is conveyed through the nip part as held in intimate contact with the fixing sleeve 7. By the heat of the fixing sleeve 7 having the temperature thereof controlled as described above and the pressure just mentioned, the unfixed toner is fixed to give rise to a fixed toner image. The sheet 14 which has passed the nip part is spontaneously separated from the fixing sleeve 7 because of the flexibility of the fixing sleeve 7 and then conveyed in the direction of right in the bearings of FIG. 5. This sheet 14 is conveyed by a paper discharging roller (not shown) and discharged onto a discharged paper tray.

In the construction of the mechanical system described above, the flexible fixing sleeve is used as the object to be heated. For this invention, the use of the flexible fixing sleeve of this type is not critical. A cylindrical metallic hard roller which is not flexible, for example, may be used in the place of the flexible fixing sleeve. In this case, while the pressing roller may be rotated as described above, the hard roller itself may be adapted so as to be driven rotationally. Alternatively, the object to be heated may be in the shape of a simple block. This block may be disposed immediately in front of the nip part or in the nip part so as to melt the toner on the sheet.

EXAMPLE 2

Figure 7:
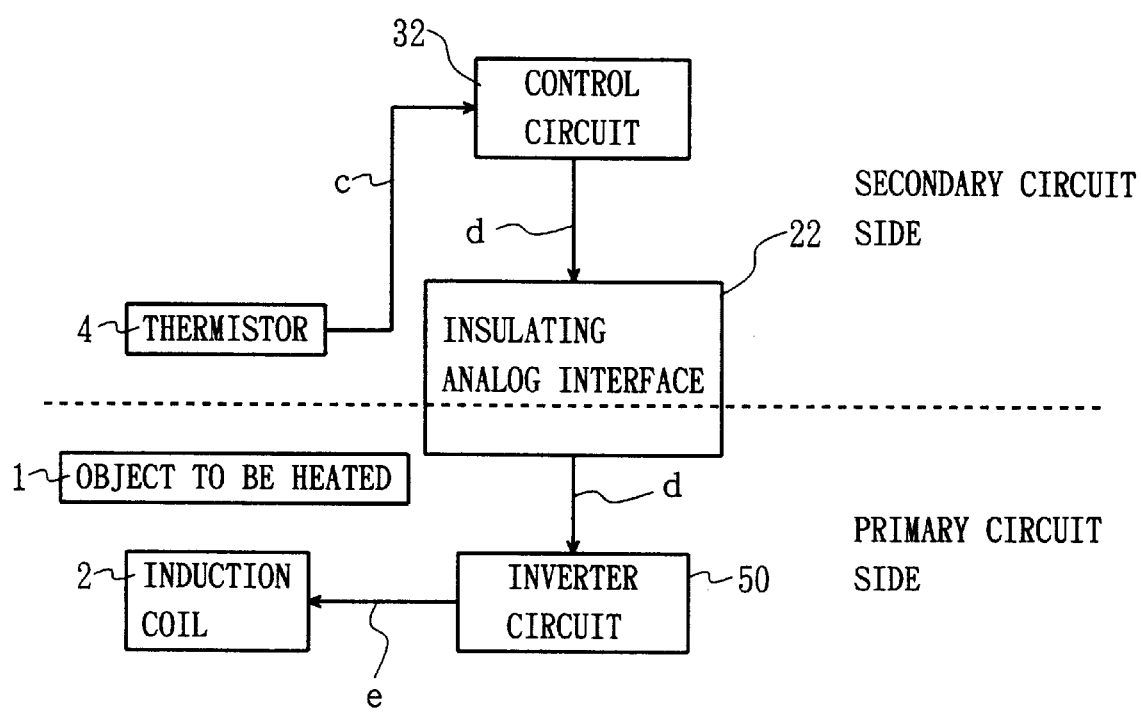
FIG. 7 is a block diagram as an aid in the description of the construction of a control system of Example 2 according to this invention.
Figure 8:
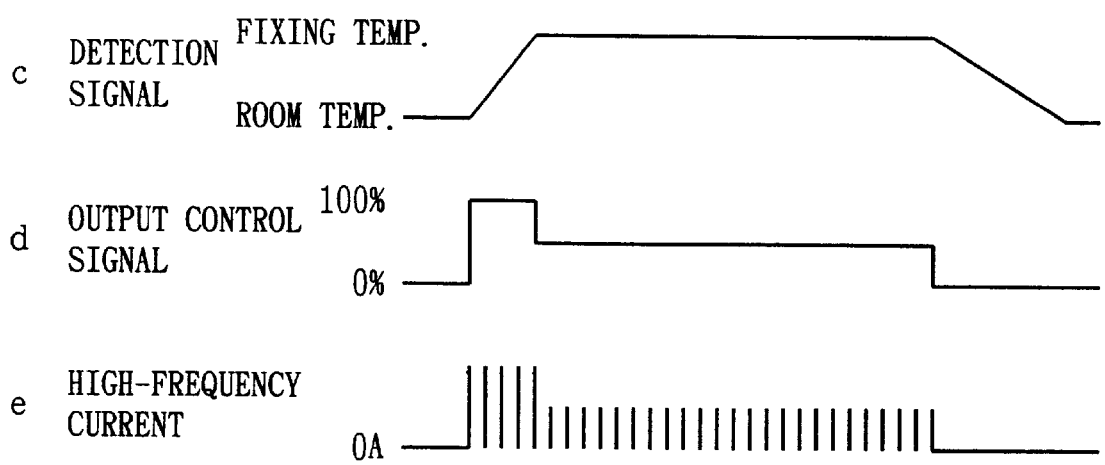
FIG. 8 is a timing chart as an aid in the description of the operation of the control system of Example 2 mentioned above.

FIG. 7 is a block diagram as an aid in the description of another construction of the control system of the induction heating fixing apparatus embodying this invention and FIG. 8 is a timing chart as an aid in the description of the operation of the induction heating fixing apparatus.

The control system of this induction heating fixing apparatus is provided, as illustrated in FIG. 7, on the secondary circuit side thereof with a control circuit 32 which controls the temperature of the object to be heated 1 and also controls the operation of the mechanical system and the conveyance of the sheet. The control circuit 32, based on the signal from the thermistor 4 disposed in the proximity of (or in contact with) the object to be heated 1, determines the heating output for controlling the temperature of the object to be heated 1 and controls the inverter circuit 50. This control circuit 32 is driven with a potential of several volts. The control system is provided on the primary circuit side with the inverter circuit 50 which is a high-frequency power source circuit for supplying a high-frequency current to the induction coil 2. It is provided between the primary circuit side and the secondary circuit side with an insulating analog interface 22 for transmitting the output control signal from the control circuit 32 in an electrically insulated state to the inverter circuit 50. The insulating analog interface 22 is intended to transmit the output control signal from the control circuit 32 in an electrically insulated state. It suffices to use a photo-coupler of some sort or other, for example, as the insulating analog interface 22. The electric signal which is the output control signal is provisionally converted into a corresponding fluctuation of the intensity of light by means of a light-emitting diode or a laser beam and the light is received in a photodiode or a CCD and converted therein again into an electric signal. Appropriately, the resolving power thereof is as high as permissible to ensure fine output control.

For the operation of the control system which is constructed as described above, the control circuit 32 continues to monitor the voltage from the thermistor 4 and meanwhile transmits the output control signal d to the inverter circuit 50 through the medium of the insulating analog interface 22 so as to start the heating of the object to be heated 1 as shown in the timing chart of FIG. 8. At first, since the object to be heated 1 is in an unheated state, the detection signal c issued from the thermistor 4 has a voltage representing room temperature and the control circuit 32 issues the output control signal d having an output of 100%. As a result, the object to be heated 1 is caused by a magnetic field generated by the induction coil 2 to emit heat and quickly reach a temperature fit for the fixation (fixing temperature, about 180 to 200° C.).

When the temperature of the object to be heated 1 is elevated to the level fit for the fixation, the detection signal of the thermistor 4 has the voltage thereof raised to a level which conforms to the fixing temperature. The control circuit 32 which is monitoring the signal from the thermistor 4 sets the output control signal d at an output of about 40 to 50% so as to prevent the temperature of the object to be heated 1 from rising further and keep the temperature at the level fit for the fixation. As a result, the high-frequency current e emitted from the inverter circuit 50 is set at an output of about 40 to 50%. As in Example 1 cited above, the temperature of the object to be heated 1 is prevented from rising and is kept at the level fit for the fixation.

As the object to be heated 1, the same metallic fixing roller (hard roller) or flexible metallic sleeve as described in Example 1 cited above can be used.

Since the inverter circuit and the mechanical system which are used in Example 2 are identical in construction with those of Example 1 cited above, their constructions will be omitted from the following description.

EXAMPLE 3

Figure 9:
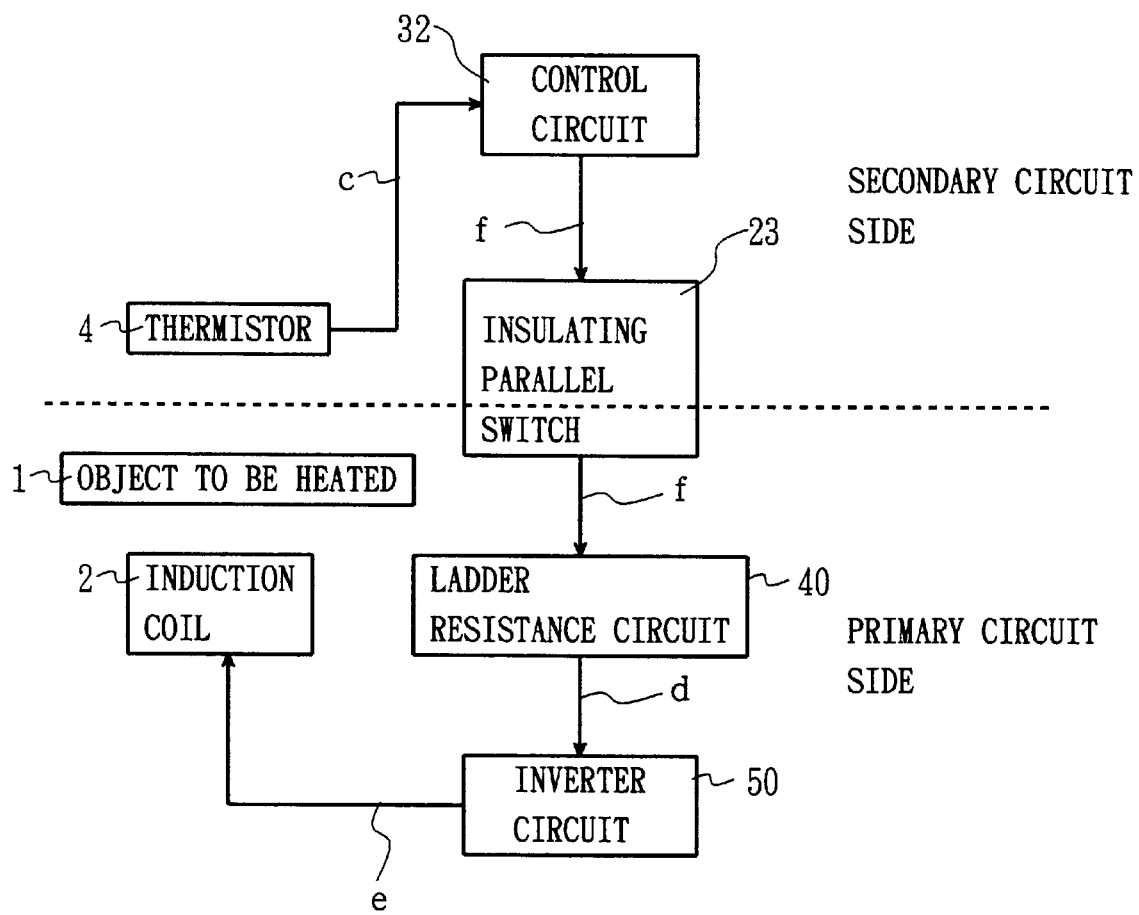
FIG. 9 is a block diagram as an aid in the description of the construction of a control system of Example 3 according to this invention.
Figure 10:
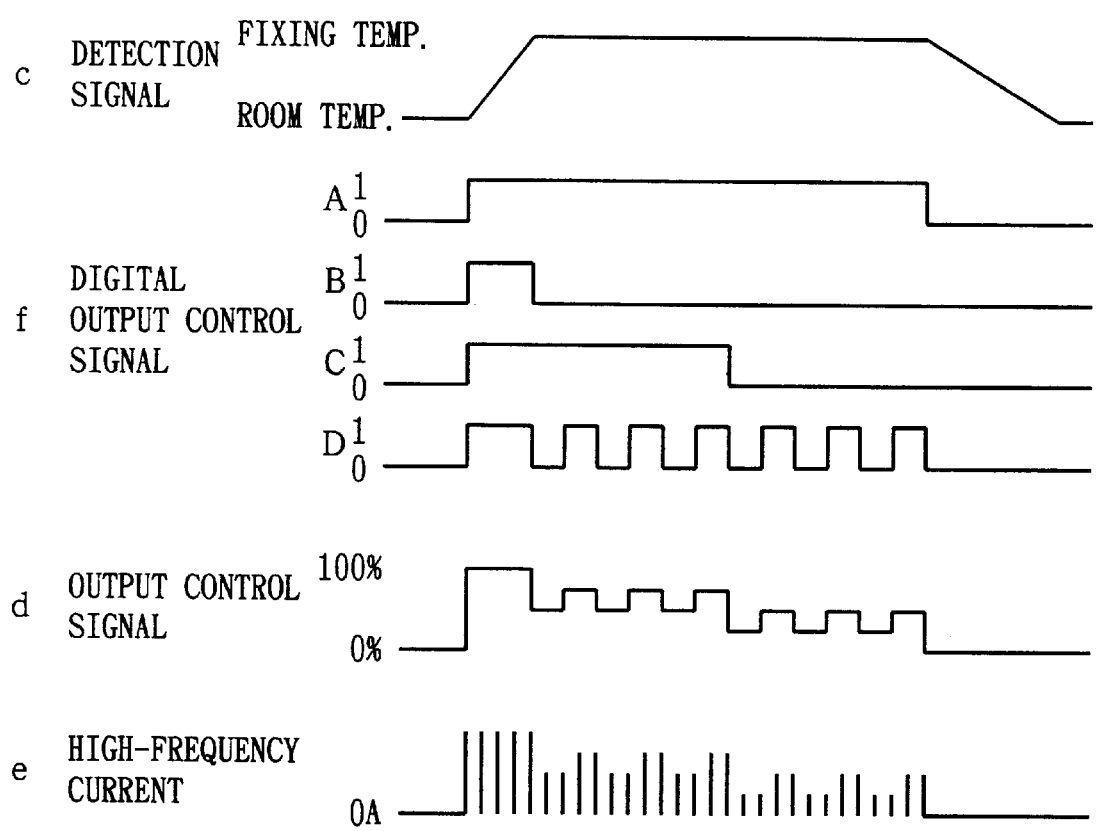
FIG. 10 is a timing chart as an aid in the description of the operation of the control system of Example 3 mentioned above.
Figure 11:
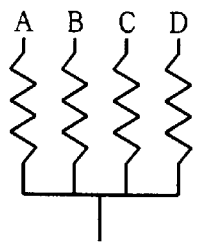
FIG. 11 is a diagram illustrating the construction of a ladder resistance circuit shown in FIG. 9 above.

FIG. 9 is a block diagram as an aid in the description of yet another construction of the control system in the induction heating fixing apparatus embodying this invention and FIG. 10 is a timing chart as an aid in the description of the operation of the induction heating fixing apparatus.

The control system of this induction heating fixing apparatus is provided, as shown in FIG. 9, on the secondary circuit side thereof with the control circuit 32 for controlling the temperature of the object to be heated 1 and for controlling the operation of the mechanical system and the conveyance of the sheet. The control circuit 32 determines the heating output for controlling the temperature of the object to be heated 1 based on the signal from the thermistor 4 disposed as approximated closely to (or held in contact with) the object to be heated 1 and then controls the inverter circuit 50. This control circuit 32 is driven by a potential of several volts. The control system is provided on the primary circuit side with the inverter circuit 50 which is a high-frequency power source circuit for supplying a high-frequency current to the induction coil 2. It is further provided between the primary circuit side and the secondary circuit side with an insulating parallel switch 23 for transmitting the output control signal from the control circuit 32 in an electrically insulated state to the inverter circuit 50 and a ladder resistance circuit 40 which is parallel/serial conversion means. In Example 3, the output control signal emanating from the control circuit 32 is a digital parallel signal and the insulating parallel switch 23 is intended to transmit a digital output control signal f from the control circuit 32 in an electrically insulated state and, therefore, is formed of a plurality of parallelly connected photocouplers, for example.

It is the ladder resistance circuit 40 that discharges the part of transmitting signal emanating from the insulating parallel switch 23 in the form of an analog signal to the inverter circuit 50. The ladder resistance circuit 40, when the digital output control signal is a four-bit signal, for example, is formed of four different parallelly arranged resistance elements intended severally for the four bits of the signal. The magnitudes of resistance of the component resistance elements which are severally lowered in accordance with the existent ON/OFF statuses of the component bits of signal are combined to form the output control signal d of voltage, which is emitted to the inverter circuit 50. It suffices, therefore, to determine the magnitudes of resistance of the component resistance elements of the ladder resistance circuit 40 so as to obtain a necessary heating output. When the heating output is expected to be evenly stepped up (a series of 25%, 50%, 75%, and 100% in the case of a four-bit signal), for example, all the magnitudes of resistance are required to be equalized. When the heating output is expected to be biased (in the pattern of a series of 40%, 50%, 75%, and 100%, for example, in the case of a four-bit signal), it suffices to determine the magnitudes of resistance of the component resistance elements in conformity to the ratio of output mentioned above. Otherwise, by combining the sequentially doubled magnitudes of resistance, R, 2×R, 4×R, and 8×R, a total of 15 steps of magnitudes from R to 15×R may be expressed and used to produce a necessary variation in the output.

The control system which is constructed as described above operates as shown in the timing chart of FIG. 10. Specifically, the control circuit 32 continues to monitor the voltage from the thermistor 4 and meanwhile transmits the output control signal d to the inverter circuit 50 through the medium of the insulating parallel switch 23 and the ladder resistance circuit 40. At first, since the object to be heated 1 is still in an unheated state, the detection signal c issued from the thermistor 4 has a voltage representing room temperature and the control circuit 32 issues the digital output control signal f having an output of 100%. As a result, the signal having all the component bits invariably in the ON status is issued when the digital output control signal f is a four-bit signal (A–D). Thus, the object to be heated 1 is caused by a magnetic field generated by the induction coil 2 to emit heat and quickly reach a temperature fit for the fixation (fixing temperature, about 180 to 200° C.).

When the temperature of the object to be heated 1 is elevated to the level fit for the fixation, the detection signal of the thermistor 4 has the voltage thereof raised to a level which conforms to the fixing temperature. The control circuit 32 which is monitoring the signal from the thermistor 4 sets the output control signal d at an output of about 40 to 50% so as to prevent the temperature of the object to be heated 1 from rising further and keep the temperature at the level fit for the fixation. In Example 3, the magnitudes of resistance of the component resistance elements of the ladder resistance circuit 40 are mutually varied so as to produce an output of about 40 to 50% by the combination of the ON/OFF statuses of the components bits, A–D. As a result, the high-frequency current e emitted from the inverter circuit 50 is set at an output of about 40 to 50%. As in Example 1 or Example 2 cited above, the temperature of the object to be heated 1 is kept at a substantially constant level.

As the object to be heated 1, the same metallic fixing roller (hard roller) or flexible metallic sleeve as described in Example 1 cited above can be used in Example 3.

Since the inverter circuit 50 and the mechanical system which are used in Example 3 are identical in construction with those of Example 1 cited above, their constructions will be omitted from the following description.

EXAMPLE 4

Figure 12:
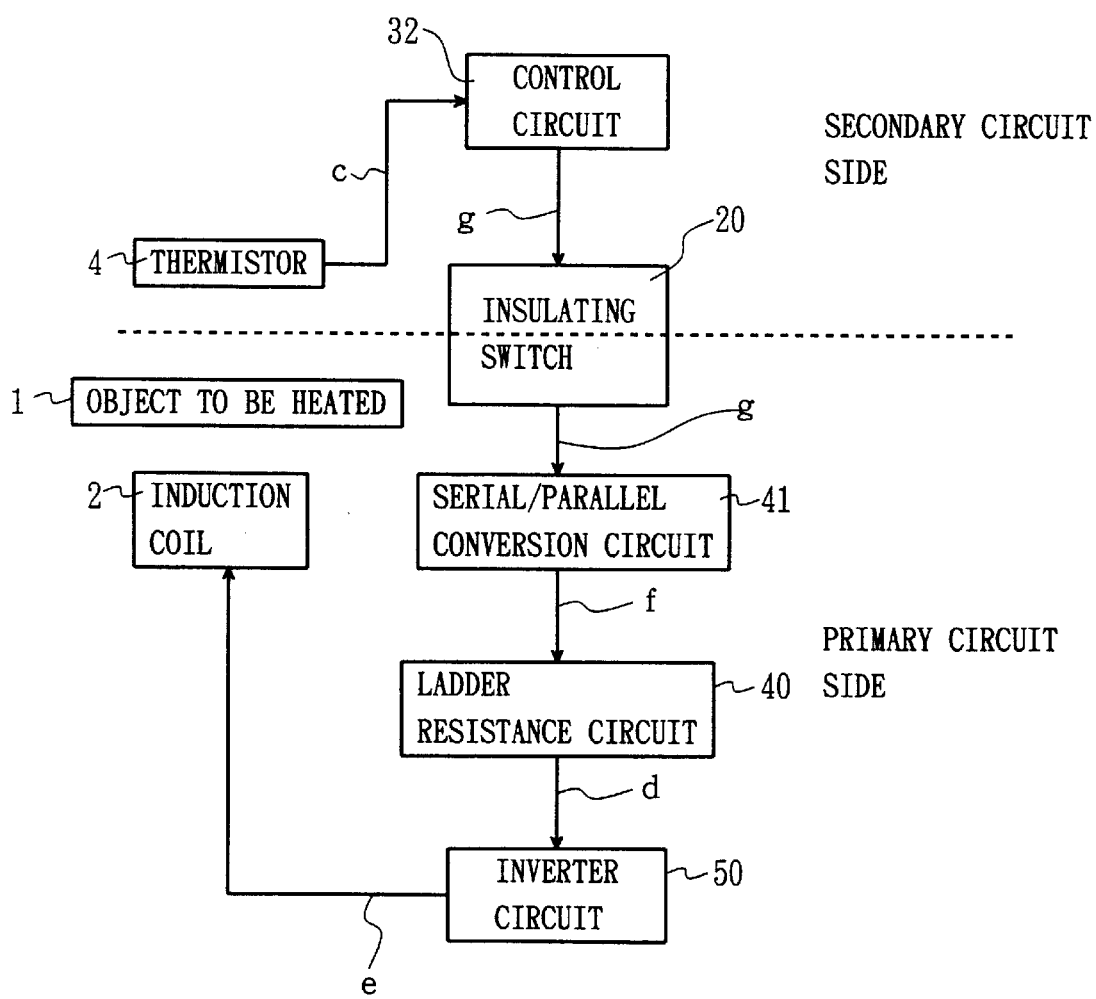
FIG. 12 is a block diagram as an aid in the description of the construction of a control system of Example 4 according to this invention.
Figure 13:
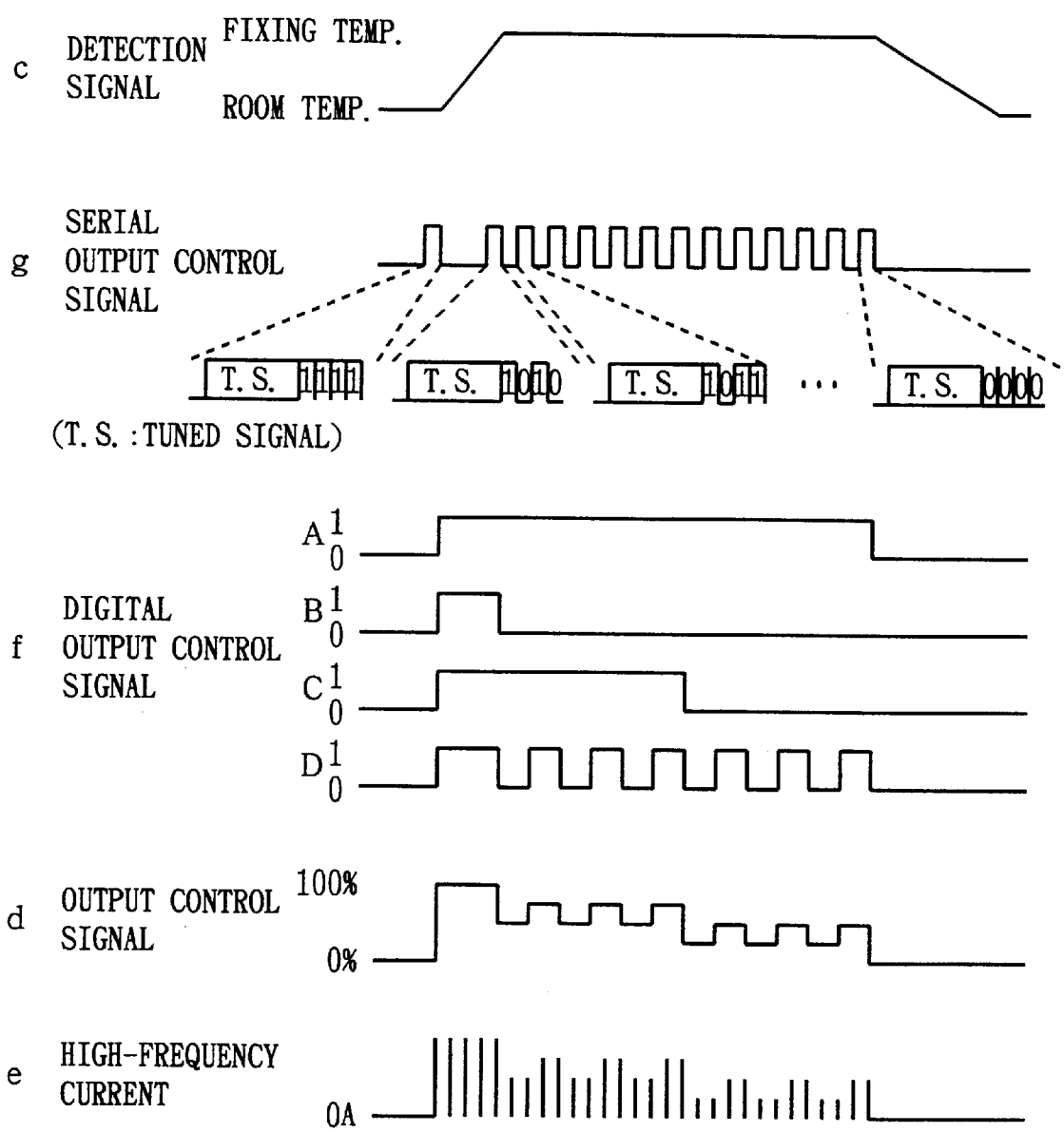
FIG. 13 is a timing chart as an aid in the description of the operation of the control system of Example 4 mentioned above.

FIG. 12 is a block diagram as an aid in the description of still another construction of the control system of the induction heating fixing apparatus embodying this invention and FIG. 13 is a timing chart as an aid in the description of the operation of the induction heating fixing apparatus.

The control system of the induction heating fixing apparatus is provided, as shown in FIG. 12, on the secondary circuit side thereof with the control circuit 32 which functions to control the temperature of the object to be heated 1 and also control the operation of the mechanical system and the conveyance of the sheet. The control circuit 32, based on the signal from the thermistor 4 disposed in the proximity of (or in contact with) the object to be heated 1, determines the heating output and controls the inverter circuit 50 so as to control the temperature of the object to be heated 1. This control circuit 32 is driven by a potential of several volts. The control system is provided on the primary circuit side thereof with the inverter circuit 50 which is a high-frequency power source circuit for supplying a high-frequency current to the induction coil 2. It is further provided between the primary circuit side and the secondary circuit side thereof with the insulating switch 20 for transmitting the output control signal from the control circuit 32 in an electrically insulated state to the inverter circuit 50, a serial/parallel conversion circuit 41, and the ladder resistance circuit 40. In Example 4, the output control signal emanating from the control circuit 32 is a digital serial output control signal g annexed by a synchronizing signal. The insulating switch 20 may be an ordinary photocoupler. The serial signal g transmitted by this insulating switch 20 is converted by the serial/parallel conversion circuit 41 into a parallel signal and, in the same manner as in Example 3 cited above, further converted to an analog signal by the ladder resistance circuit 40 and transmitted to the inverter circuit 50.

The control system which is constructed as described above operates as shown in the timing chart of FIG. 13. Specifically, the control circuit 32 continues to monitor the voltage from the thermistor 4 and meanwhile transmits the output control signal d to the inverter circuit 50 through the medium of the insulating switch 20, the serial/parallel conversion circuit 41, and the ladder resistance circuit 40. At first, since the object to be heated 1 is still in an unheated state, the detection signal c issued from the thermistor 4 has a voltage representing room temperature and the control circuit 32 issues the serial output control signal g having an output of 100%. When the serial output control signal g emanating from the control circuit 32 represents a four-bit (A–D) digital data, the synchronizing signal is issued first and then the data of each of the component bits are issued. Then, the serial signal is converted into a parallel digital signal (digital output control signal f) by the serial/parallel conversion circuit 41. This parallel digital signal is subsequently converted into an analog signal by the ladder resistance circuit 40 in the same manner as in Example 3 cited above. The serial output control signal g is issued only when the heating output is to be varied. The serial/parallel conversion circuit 41, after having received the serial output control signal g, is retained in the ensuant state while emitting a parallel signal for each of the component bits. As a result, the object to be heated 1 is caused by a magnetic field generated by the induction coil 2 to emit heat and quickly reach a temperature fit for the fixation (fixing temperature, about 180 to 200° C.).

When the temperature of the object to be heated 1 is elevated to the level fit for the fixation, the detection signal of the thermistor 4 has the voltage thereof raised to a level which conforms to the fixing temperature. The control circuit 32 which is monitoring the signal from the thermistor 4 sets the output control signal d at an output of about 40 to 50% so as to prevent the temperature of the object to be heated 1 from rising further and keep the temperature at the level fit for the fixation. In the present example, similarly to Example 3 cited above, the magnitudes of resistance of the component resistance elements of the ladder resistance circuit 40 are mutually varied so as to produce an output of about 40 to 50% by the combination of the ON/OFF statuses of the components bits, A–D. As a result, the high-frequency current e emitted from the inverter circuit 50 is set at an output of about 40 to 50%. As in Example 1 to Example 3 cited above, the temperature of the object to be heated 1 is kept at a substantially constant level.

As the object to be heated 1, the same metallic fixing roller (hard roller) or flexible metallic sleeve as described in Example 1 cited above can be used in Example 4. Since the inverter circuit 50 and the mechanical system which are used in Example 4 are identical in construction with those of Example 1 cited above, their constructions will be omitted from the following description.

EXAMPLE 5

Figure 14:
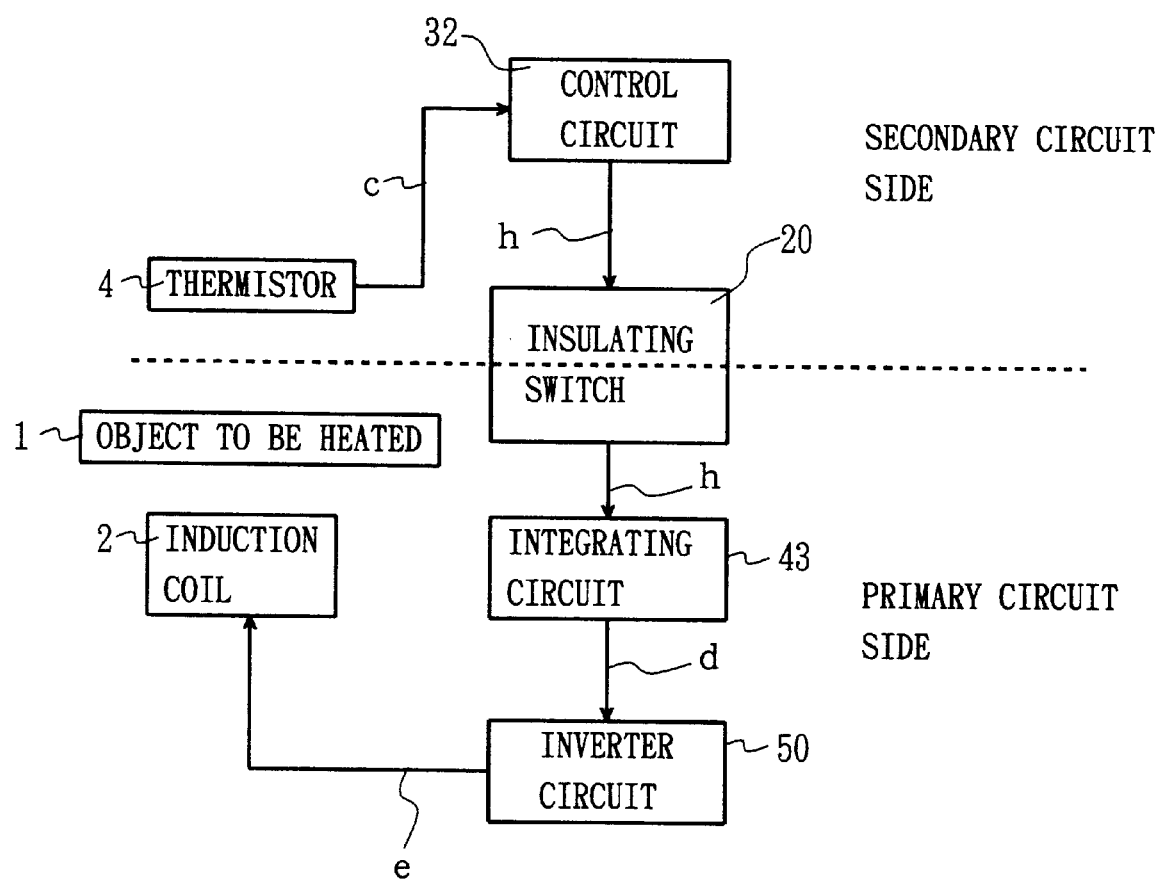
FIG. 14 is a block diagram as an aid in the description of the construction of a control system of Example 5 according to this invention.
Figure 15:
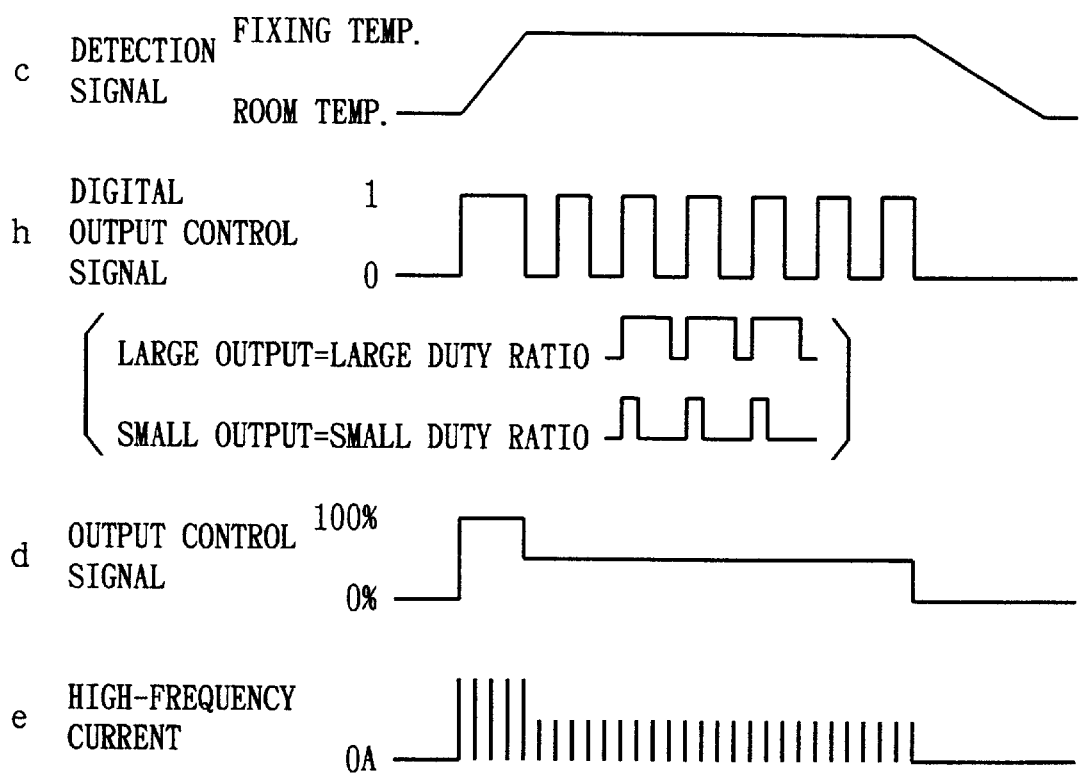
FIG. 15 is a timing chart as an aid in the description of the operation of the control system of Example 5 mentioned above.

FIG. 14 is a block diagram as an aid in the description of another construction of the control system of the induction heating fixing apparatus embodying this invention and FIG. 15 is a timing chart as an aid in the description of the operation of the induction heating fixing apparatus.

The control system of the induction heating fixing apparatus is provided, as shown in FIG. 14, on the secondary circuit side thereof with the control circuit 32 which functions to control the temperature of the object to be heated 1 and also control the operation of the mechanical system and the conveyance of the sheet. The control circuit 32, based on the signal from the thermistor 4 disposed in the proximity of (or in contact with) the object to be heated 1, determines the heating output and controls the inverter circuit 50 so as to control the temperature of the object to be heated 1. This control circuit 32 is driven by a potential of several volts. The control system is provided on the primary circuit side thereof with the inverter circuit 50 which is a high-frequency power source circuit for supplying a high-frequency current to the induction coil 2. It is further provided between the primary circuit side and the secondary circuit side thereof with the insulating switch 20 for transmitting the output control signal from the control circuit 32 in an electrically insulated state to the inverter circuit 50 and an integrating circuit 43 for converting a digital signal to an analog signal. In Example 5, the control signal which emanates from the control circuit 32 is a digital output control signal h having the ON/OFF durations in a varied duty ratio. The insulating switch 20 may be an ordinary photocoupler. The digital output control signal h transmitted by this insulating switch 20 is converted by the integrating circuit 43 into an analog output control signal d and then transmitted to the inverter circuit 50.

The control system which is constructed as described above operates as shown in the timing chart of FIG. 15. Specifically, the control circuit 32 continues to monitor the voltage from the thermistor 4 and meanwhile transmits the output control signal d to the inverter circuit 50 through the medium of the insulating switch 20 and the integrating circuit 43. At first, since the object to be heated 1 is still in an unheated state, the detection signal c issued from the thermistor 4 has a voltage representing room temperature and the control circuit 32 issues the digital output control signal h having an output of 100%. When the digital output control signal h so emitted has an output of 100%, for example, the integrating circuit 43 which has received this signal through the medium of the insulating switch 20 is enabled by continuing the ON signal for a prescribed duration to emit the output control signal d for producing an output of 100% to the inverter circuit 50. As a result, the object to be heated 1 is caused by a magnetic field generated by the induction coil 2 to emit heat and quickly reach a temperature fit for the fixation (fixing temperature, about 180 to 200° C.).

When the temperature of the object to be heated 1 is elevated to the level fit for the fixation, the detection signal of the thermistor 4 has the voltage thereof raised to a level which conforms to the fixing temperature. The control circuit 32 which is monitoring the signal from the thermistor 4 sets the output control signal d at an output of about 40 to 50% so as to prevent the temperature of the object to be heated 1 from rising further and keep the temperature at the level fit for the fixation. In the present example, by setting the duration in which the digital output control signal h is kept in the ON status at a level in the range of 40 to 50% for a prescribed duration, namely by varying the duty ratio of the digital output control signal h, the integrating circuit 43 is enabled to emit the output control signal d conforming to the ratio of the ON durations to the inverter circuit 50. As a result, the high-frequency current e emitted from the inverter circuit 50 produces an output of about 40 to 50% and, in the same manner as in Examples 1 to 4 cited above, the temperature of the object to be heated 1 is kept at a substantially constant level.

As the object to be heated 1, the same metallic fixing roller (hard roller) or flexible metallic sleeve as described in Example 1 cited above can be used in Example 5. Since the inverter circuit 50 and the mechanical system which are used in Example 5 are identical in construction with those of Example 1 cited above, their constructions will be omitted from the following description.

While there have been shown and described present preferred embodiments of the invention, it is to be distinctly understood that the invention is not limited thereto but may be otherwise variously embodied and practiced by any person of ordinary skill in the art within the scope of the technical idea of this invention.

What is claimed is:

1. An induction heating fixing apparatus for enabling an object formed of an electroconductive material to be heated to emit heat comprising:

a coil disposed in the proximity of the object to be heated thereby causing the object to be heated by an induced current;

a high-frequency power source circuit which supplies the high-frequency current to the coil;

a control circuit which issues a control signal designating start or stop of the heating of the object to be heated;

a detector which detects the temperature of the object to be heated;

an adjusting circuit which adjusts the magnitude of electric power of the high-frequency current supplied by said high-frequency power source circuit to the coil based on the temperature detected by said detector when the control signal issued directly from said control circuit designates start of the heating; and a signal transmitting path which transmits the control signal from said control circuit to said adjusting circuit, said signal transmitting path being so adapted as to effect the transmission of the control signal with said control circuit and said adjusting circuit kept in a mutually electrically insulted state.

2. An induction heating fixing apparatus according to claim 1, wherein said signal transmitting path is provided with an insulating switch.

3. An induction heating fixing apparatus according to claim 2, wherein said insulating switch transmits an electric signal as converted into a light signal.

4. An induction heating fixing apparatus according to claim 3, wherein said insulating switch is a photocoupler.

5. An induction heating fixing apparatus according to claim 1, which further comprises a second transmitting path for transmitting a ready signal to said control circuit when the temperature of the object to be heated detected by said detector reaches a fixing temperature and wherein said second transmitting path effects the transmission of the ready signal as kept in a state electrically insulated from said control circuit.

6. An induction heating fixing apparatus according to claim 1, wherein said high-frequency power source circuit is an inverter circuit.

7. An induction heating fixing apparatus according to claim 6, which further comprises coil current detector which detects the coil current in said coil and wherein said adjusting circuit designates a magnitude of the coil current and controls an ON/OFF timing of said inverter circuit by comparing the magnitude of coil current detected in said inverter circuit by said coil current detector with the magnitude of coil current designated thereby.

8. An induction heating fixing apparatus according to claim 6, which further comprises timing generator which controls an ON/OFF timing of said inverter circuit, said timing generating means being so adapted as to have the OFF timing thereof determined by said adjusting circuit.

9. An induction heating fixing apparatus for enabling a fixing member formed of an electroconductive material to be heated to emit heat comprising:
   a fixing member;
   a coil disposed in the proximity of the fixing member to be heated thereby causing the fixing member to be heated by an induced current;
   a high-frequency power source circuit which supplies the high-frequency current to the coil;
   a detector which detects the temperature of the fixing member to be heated;
   a control circuit which issues a control signal for adjusting the magnitude of electric power of the high-frequency current supplied by said high-frequency power source circuit to the coil based on the temperature detected by the detector; and
   a signal transmitting path which transmits the control signal directly from said control circuit to said high-frequency power source circuit, said signal transmitting path being so adapted as to effect the transmission of the control signal with said control circuit and said high-frequency power source circuit kept in a mutually electrically insulated state.

10. An induction heating fixing apparatus according to claim 9, wherein the control signal issued by said control circuit is an analog signal.

11. An induction heating fixing apparatus according to claim 10, wherein said signal transmitting path is an insulating analog interface adapted to convert provisionally the analog signal into a corresponding fluctuation of the intensity of light, transmit the fluctuation, and thereafter revert the fluctuation into an electric signal.

12. An induction heating fixing apparatus according to claim 9, wherein the control signal issued by said control circuit is a parallel signal.

13. An induction heating fixing apparatus according to claim 12, wherein said signal transmitting path comprises a plurality of photocouplers.

14. An induction heating fixing apparatus according to claim 12, which further comprises a parallel/serial converter which converts the parallel signal transmitted by said signal transmitting path into a serial signal.

15. An induction heating fixing apparatus according to claim 14, wherein said parallel/serial converter is a ladder resistance circuit formed of a plurality of resistance elements and said ladder resistance circuit is so adapted that the plurality of resistance elements thereof may severally receive a corresponding component of the parallel signal and emit an analog serial signal as an output.

16. An induction heating fixing apparatus according to claim 9, wherein the control signal emitted by said control circuit is a digital serial signal.

17. An induction heating fixing apparatus according to claim 16, wherein said signal transmitting path transmits an electric signal as converted into a light signal.

18. An induction heating fixing apparatus according to claim 17, wherein said signal transmitting path is a photocoupler.

19. An induction heating fixing apparatus according to claim 16, which further comprises a serial/parallel converter which converts the serial signal transmitted by said signal transmitting path into a parallel signal and a digital/analog converter which converts the parallel signal converted by said serial/parallel converter to an analog signal.

20. An induction heating fixing apparatus according to claim 9, wherein the control signal issued by said control circuit is a digital signal having a varied duty ratio of the ON and OFF durations.

21. An induction heating fixing apparatus according to claim 20, which further comprises a digital/analog converter which converts the digital signal transmitted by said signal transmitting path into an analog signal.

22. An induction heating fixing apparatus according to claim 21, wherein said digital/analog converter is an integrating circuit.

23. An induction heating fixing apparatus according to claim 9, wherein said high-frequency power source circuit is an inverter circuit.

24. An induction heating fixing apparatus according to claim 23,
   which further comprises coil current detector which detects the coil current in said coil and wherein said control signal designates a magnitude of the coil current and controls an ON/OFF timing of said inverter circuit by comparing the magnitude of coil current detected by said coil current detector in said inverter circuit with the magnitude of coil current designated thereby.

25. An induction heating fixing apparatus according to claim 23,
   which further comprises timing generator which controls an ON/OFF timing of said inverter circuit, said timing generating means having the OFF timing thereof determined by said control signal.

26. A method for controlling the temperature of an to be heated in an induction heating fixing apparatus for enabling the object formed of an electroconductive material to be heated to emit heat comprising:
   a step of providing a coil disposed in the proximity of the fixing object to be heated thereby causing the fixing object to be heated by generating an induced current;
   a step of emitting a control signal designating start of supplying a high-frequency current to the coil by a control circuit;
   a step of transmitting the emitted control signal directly to an adjusting circuit through a medium of a signal transmitting path, the signal transmitting path effecting the transmission of the control signal with the control circuit and the adjusting circuit in a mutually electrically insulated state;
   a step of detecting the temperature of the object to be heated;
   a step of determining the magnitude of electric power of the high-frequency current supplied to the coil based on the detected temperature in response to the control signal transmitted thereto; and
   a step of supplying the high-frequency current of the determined magnitude of electric power to the coil.

27. A method according to claim 26, wherein the signal transmitting path is provided with an insulating switch.

28. A method according to claim 27, wherein the insulating switch transmits the electric signal as converted to a light signal.

29. A method according to claim 28, wherein the insulating switch is a photocoupler.

30. A method according to claim 26,
   which further comprises a step of transmitting a ready signal to the control circuit through the medium of a second transmitting path when the detected temperature of the object to be heated reaches a fixing temperature, the second transmitting circuit being so adapted as to effect the transmission of the ready signal as kept in a state insulated electrically from the control circuit.

31. A method according to claim 26, wherein the high-frequency current is supplied to the coil via an inverter circuit.

32. A method according to claim 31, which further comprises a step of detecting the coil current flowing to the coil by current detecting means and a step of determining the ON/OFF timing of the inverter circuit by comparing the magnitude of the coil current detected as above with the magnitude of the coil current determined by the control signal.

33. A method according to claim 31, which further comprises a step of determining the ON/OFF timing of the inverter circuit by the control signal and a step of controlling the ON/OFF status of the inverter circuit by timing generating means in accordance with the timing determined as above.

34. A method for controlling the temperature of a fixing member to be heated in an induction heating fixing apparatus for enabling the fixing member formed of an electroconductive material to be heated to emit heat comprising:

a step of providing a coil disposed in the proximity of the fixing member to be heated thereby causing the fixing member to be heated by generating an induced current;

a step of detecting the temperature of the fixing member to be heated;

a step of determining the magnitude of electric power of the high-frequency current supplied to the coil based on the detected temperature;

a step of issuing from a control circuit a control signal for the flow of the high-frequency current of the magnitude of electric power to the coil;

a step of transmitting the issued control signal directly to a high-frequency power source circuit through a medium of a signal transmitting path, the signal transmitting path effecting the transmission of the control signal with the control circuit and the high-frequency power source circuit kept in a mutually electrically insulated state; and a step of supplying a high-frequency current to the coil in accordance with the transmitted control signal.

35. A method according to claim 34, wherein the control signal issued by the control circuit is an analog signal.

36. A method according to claim 35, wherein the signal transmitting path is an insulating analog interface adapted to convert provisionally the analog signal into a corresponding fluctuation of the intensity of light, transmit the fluctuation, and thereafter revert the fluctuation into an electric signal.

37. A method according to claim 34, wherein the control signal issued by the control circuit is a parallel signal.

38. A method according to claim 37, wherein the signal transmitting path comprises a plurality of photocouplers.

39. A method according to claim 37, which further comprises a step of converting the parallel signal transmitted through the signal transmitting path into an analog serial signal by parallel/serial conversion means.

40. A method according to claim 38, wherein the parallel/serial conversion means is a ladder resistance circuit formed of a plurality of resistance elements and the ladder resistance circuit is so adapted that the plurality of resistance elements thereof may severally receive a corresponding component of the parallel signal and emit an analog serial signal as an output.

41. A method according to claim 34, wherein the control signal issued by the control circuit is a digital serial signal.

42. A method according to claim 41, which further comprises a step of converting the digital serial signal transmitted through the signal transmitting path into a parallel signal by serial/parallel conversion means and a step of converting the converted parallel signal into an analog signal by digital/analog conversion means.

43. A method according to claim 34, wherein the control signal issued by the control circuit is a digital signal having a varied duty ratio of the ON and OFF durations.

44. A method according to claim 43, which further comprises a step of converting the digital signal having a varied duty ratio of the ON and OFF durations transmitted through the signal transmitting path into an analog signal by integrating the ON duration in accordance with the duty ratio.

45. A method according to claim 34, wherein the high-frequency current for the flow to the coil is supplied from an inverter circuit.

46. A method according to claim 45, which further comprises a step of detecting the coil current flowing to the coil by current detecting means and a step of determining the ON/OFF timing of the inverter circuit by comparing the magnitude of the coil current detected as above with the magnitude of the coil current determined by the control signal.

47. A method according to claim 45, which further comprises a step of determining an ON/OFF timing of the inverter circuit by the control signal and a step of controlling the ON/OFF status of the inverter circuit by a timing generating means in accordance with the timing determined as above.

* * * * *

UNITED STATES PATENT AND TRADEMARK OFFICE
CERTIFICATE OF CORRECTION

PATENT NO.   : 5,928,551
DATED        : July 27, 1999
INVENTOR(S)  : Eiji Okabayashi It is certified that error appears in the above-identified patent and that said Letters Patent is hereby corrected as shown below:

Column 16,
Line 32, after "signal", insert -- directly --;
Lines 33-36, delete "said signal transmitting path being so adapted as to effect the transmission of the control signal with said control circuit and said adjusting circuit kept in a mutually electrically insulted state" and insert -- and which electrically insulates said control circuit from said adjusting circuit --;

Column 17,
Lines 22-26, delete "said signal transmitting path being so adapted as to effect the transmission of the control signal with said control circuit and said high-frequency power source circuit kept in a mutually electrically insulated state" and insert -- and which electrically insulates said control circuit from said high-frequency power source --;

Column 18,
Line 31, after "an", insert -- object --;
Lines 44-47, delete "effecting the transmission of the control signal with the control circuit and the adjusting circuit in a mutually electrically insulated state" and insert -- electrically insulating said control circuit from said adjusting circuit --;

Column 19,
Lines 40-43, delete "effecting the transmission of the control signal with the control circuit and the high-frequency power source circuit kept in a mutually electrically insulated state" and insert -- electrically insulating the control circuit and said high-frequency power source circuit --.

Signed and Sealed this

Twenty-first Day of January, 2003

JAMES E. ROGAN
*Director of the United States Patent and Trademark Office*